US012730983B2

(12) United States Patent
Shi et al.

(10) Patent No.: US 12,730,983 B2
(45) Date of Patent: Sep. 8, 2026

(54) RELATION EXTRACTION SYSTEM AND METHOD ADAPTED TO FINANCIAL ENTITIES AND FUSED WITH PRIOR KNOWLEDGE

(71) Applicant: Huazhong University Of Science And Technology, Wuhan City (CN)

(72) Inventors: Xuanhua Shi, Wuhan City (CN); Yao Wan, Wuhan City (CN); Teng Zhang, Wuhan City (CN); Hai Jin, Wuhan City (CN); Nan Cao, Wuhan City (CN); Mengfan Li, Wuhan City (CN)

(73) Assignee: Huazhong University of Science and Technology, Wuhan City (CN)

( * ) Notice: Subject to any disclaimer, the term of this patent is extended or adjusted under 35 U.S.C. 154(b) by 432 days.

(21) Appl. No.: 18/217,207

(22) Filed: Jun. 30, 2023

(65) Prior Publication Data

US 2024/0086650 A1 Mar. 14, 2024

(30) Foreign Application Priority Data

Sep. 6, 2022 (CN) ........................ 202211094335.5

(51) Int. Cl.
*G06F 40/53* (2020.01)
*G06F 40/295* (2020.01)
*G06F 40/30* (2020.01)

(52) U.S. Cl.
CPC ........... *G06F 40/53* (2020.01); *G06F 40/295* (2020.01); *G06F 40/30* (2020.01)

(58) Field of Classification Search
None
See application file for complete search history.

(56) References Cited

FOREIGN PATENT DOCUMENTS

CN 112347759 A * 2/2021 ............ G06F 16/35

OTHER PUBLICATIONS

Kuang, et al. "A Keyword Detection and Context Filtering Method for Document Level Relation Extraction," Applied Sciences, Jan. 14, 2022. (see attached reference in the previous OA) (Year: 2022).*

(Continued)

*Primary Examiner* — Paras D Shah
(74) *Attorney, Agent, or Firm* — Smart & Biggar LP

(57) ABSTRACT

The present invention relates to a relation extraction system adapted to financial entities and fused with prior knowledge and a method thereof, the system at least comprising: a deep pretraining module, for training and generating a deep pretrained model for recognizing attributes of the financial entities; a keyword analyzing module, for extracting and outputting positional information and importance vectors of keywords in a Chinese finance-related text; an attention mechanism module, for encoding the positional information of the keywords to obtain attention masks, and inputting them with entity information into the deep pretrained model to acquire text feature vectors; and an optimal margin distribution model module, for predicting financial-entity relations based on the text feature vectors and the importance vectors. Aiming at low applicability of existing models to specific Chinese fields, the present invention obtains more accurate extraction results of entities and related features in Chinese finance-related texts.

18 Claims, 2 Drawing Sheets

(56) References Cited

OTHER PUBLICATIONS

Carroll, et al. "Computer Selection of Keywords Using Word-Frequency Analysis," American Documentation, Jul. 1969. (see attached reference in the previous OA) (Year: 1969).*

Arora et al. "Automated Extraction and Clustering of Requirements Glossary Terms," IEEE Transactions on Software Engineering, vol. 43, No. 10, Oct. 2017. (see attached reference in the previous OA) (Year: 2017).*

Abdelhaq, et al. "Efficient online extraction of keywords for localized events in twitter," Geoinformatica (2017). (see attached reference in the previous OA) (Year: 2017).*

* cited by examiner

RELATION EXTRACTION SYSTEM AND METHOD ADAPTED TO FINANCIAL ENTITIES AND FUSED WITH PRIOR KNOWLEDGE

BACKGROUND OF THE INVENTION

1. Technical Field

The present invention relates to a technical field of relation-extracting models for natural language processing in computers, and more particularly to a system and a method for financial-entity relation extraction fused with prior knowledge.

2. Description of Related Art

Relation extraction is a common task in the field of natural language processing. Two entities having a relation therebetween may be named as a subject and an object, respectively. Relation extraction is to find out the relation between a subject and an object from non-structured or semi-structured data and to represent the relation in the form of an entity-relation triplet (i.e., subject, relation, object). The existing relation extracting models are usually general and designed for English texts, so they tend to perform poor when applied to Chinese texts or relation extracting tasks for some certain sectors. With economic advancement, data recording various economic and financial activities grow explosively. Analysis of these data may give insights that are valuable to the financial sector.

Recently, relation extraction technologies like deep learning use large pretrained models and massive corpora to extract text features and use specific mapping to represent semantic information of entities and relations in texts as low-dimensional continuous space vectors, and then perform computing and processing on the vectors so as to predict complex semantic information corresponding to relations among entities. However, as most of the known models focus only on extraction of text features, they have some problems related to poor generalization ability and semantic interpretability when building relation predicting models from text feature vectors. By introducing prior knowledge of specific sectors and using improved classifying model frameworks into the modeling process, and using Chinese analysis tools to construct a Chinese financial knowledge analyzing module, the information critical to the relation among financial entities can be better reflected. With text feature vectors fused, the use of a high-performance multi-class optimal margin distribution model can then significantly improve relation extraction. Nevertheless, there are still some issues left unaddressed: (1) currently, analysis of financial knowledge merely involves word segmentation and statistics, without considering keyword orders and deeper information like semantics; and (2) the existing work merely covers extraction of entity pairs and individual relation, leaving multi-entity multi-relation extracting tasks unsolved.

For example, China Patent Publication No. CN114417846A discloses an entity relationship extraction method based on attention contribution degree and application thereof. The method comprises the steps of carrying out word segmentation on original sentences in a data set through spaCy to obtain a word list, and storing the word list and labels into an input data set D in a dictionary form; then sampling the input data set D to obtain an entity sample set and a relation sample set of each sentence in the input data set D; selecting a pretrained BERT model on a large-scale biomedical corpus, a judicial database and a tourism database, calculating interaction information between entities by adopting an attention contribution algorithm, and transmitting the interaction information to a downstream entity extraction and relationship extraction task to form an entity relationship extraction model based on span; and finally, putting the entity sample set and the relation sample set into an entity relation extraction model based on span for training, and greatly improving the F1 value of the entity extraction task and the F1 value of the relation extraction task. However, the BioBERT model used in the existing method is designed for biomedical text mining. On the other hand, in relation prediction, use of vectors of entities to represents the context relation with max pooling, some information of relation between the entities and sentences may be lost. Also, this known approach fails to use the prior knowledge in the related sectors to explore the potential connection between entities and relation.

China Patent Publication No. CN112800774A discloses an entity relationship extraction method, device, medium and equipment based on attention mechanism. The method comprises the following steps: preprocessing the content of an original text, and inputting the content into a BERT pretrained model to obtain text vector representation of each word of a text sentence; inputting the text vector into a convolutional neural network to obtain a sentence convolutional characteristic vector; the text vector is processed by an attention weight calculation unit to obtain a semantic context vector containing entity information; and then connecting the two into a feature vector, and calculating through a fully-connected neural network and a SoftMax function to obtain the probabilities of different classes, wherein the maximum probability corresponds to the entity relationship type of the entity pair. However, the prior-art technology merely considers sentence contextual information and fails to use entity attribute information and entity positional information. Besides, the prior invention makes no optimization for extraction of relation in any specific sector, and therefore fails the possibility of further optimizing its model by using the prior knowledge in a specific sector.

Hence, how to introduce Chinese financial knowledge into representation of text feature vectors and how to optimize a relation extracting model are core issues to be addressed by the present invention. The present invention is thus proposed to not only improve model performance for finance-specific applications by performing targeted training on its model with the collected Chinese financial corpora, but also build a Chinese finance-related text analyzing module to introduce the prior knowledge with a large pretrained model, thereby enriching information provided by text feature vectors and optimizing extraction of features to improve the model in terms of interpretability.

Since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with the related art more existing technical features as support according to relevant regulations.

SUMMARY OF THE INVENTION

In view of the shortcomings of the prior art, the present invention adopts a relation extraction system adapted to financial entities and fused with prior knowledge, the system at least comprising: a deep pretraining module, for training a deep neural network based on finance-related corpora and generating a deep pretrained model capable of recognizing attributes of the financial entities; a keyword analyzing module, for extracting with respect to Chinese finance-related prior knowledge and outputting positional information and importance vectors of keywords in a Chinese finance-related text; an attention mechanism module, for encoding the positional information of the keywords in the Chinese finance-related text so as to obtain attention masks, and inputting the attention masks and entity information of the Chinese finance-related text to the deep pretrained model so as to acquire text feature vectors; and an optimal margin distribution model module, for predicting financial-entity relations based on the text feature vectors and the importance vectors received as inputs, wherein the attention mechanism module is in connection with the deep pretraining module, the keyword analyzing module, and the optimal margin distribution model module, respectively.

To address the shortcomings of the prior art, the present invention provides a relation extraction system adapted to financial entities and fused with prior knowledge and its method, having improved capability of extracting text features according to Chinese finance-related prior knowledge and therefore improved semantic expressing ability. By training text feature vectors with a multi-class optimal margin distribution model, the present invention performs better than existing relation extracting models in Chinese finance-related relation extracting tasks.

Preferably, the keyword analyzing module is configured to: analyze the Chinese finance-related text and collect the related corpora, and partition the corpora into corpus sets based on a collected Chinese finance-related glossary and/or the financial-entity relations; perform word segmentation on the corpus sets corresponding to the Chinese finance-entity relations, and sort the keyword in a descending order by word frequency; normalize word frequencies of the keywords whose sorted places are higher than a predetermined place and word frequencies of synonyms of these keywords into the importance vectors, and output a keyword set of the financial-entity relations and the corresponding importance vectors.

Preferably, the attention mechanism module is configured to: extract structure representation vectors of the financial entities; perform vector optimization on the financial entity that has a specified name based on self-attention features in sentences so that certain discrimination exists between/among the structure representation vectors of the same entity in the different sentences; and encode the positional information of the keywords so as to obtain the attention masks.

Preferably, the optimal margin distribution model module is configured to: stitch the received text feature vectors and the importance vectors together to form sentence representation vectors and input them into an optimal margin distribution model, and use the optimal margin distribution model to output prediction information about the financial-entity relations.

The present invention analyzes characteristics of finance-related texts and extracts finance-related keywords as well as correlation between financial-entity relation and the keywords. The present invention not only combines BERT models and the attention mechanism to further extract text features for enhanced representation at the sentence level, but also introduces the theory of multi-class optimal margin distribution into learning of financial-entity relation in texts, thereby making better use of entities in Chinese finance-related texts and related features, and obtaining more accurate relation extraction.

Preferably, the deep pretraining module is further configured to: construct an entity-attribute predicting model based on a first BERT deep neural network model so as to execute entity-attribute prediction, construct an entity-relation extracting model based on a second BERT deep neural network model so as to execute entity-relation extraction, and execute entity annotation based on a BERT-LSTM+CRF model.

Preferably, the keyword analyzing module is further configured to: collect the Chinese finance-related glossary by: extracting common words from the Chinese finance-related text as supplements to a general word-segmentation dictionary, so as to form the finance-related glossary.

Preferably, the keyword analyzing module normalizes the word frequencies of the keywords whose sorted places are superior to the predetermined place and the word frequencies of the synonyms of these keywords into the importance vectors using:

$$p_i = a_i / \sum_{i=1}^{n} a_i$$

where $p_i$ denotes an importance value, $a_i$ denotes the word frequency, n denotes a preset number, and i denotes an index of the statistically top n keywords.

Preferably, the attention mechanism module obtains the attention masks by: setting the attention masks m according to the positional information of the keywords in the Chinese finance-related text, wherein when the keywords exist in the Chinese finance-related text, m=1; otherwise m=0.

Preferably, the deep pretraining module acquires the text feature vectors by: assigning a high weight to a part of the Chinese finance-related text where the attention mask m=1 so as to reflect information of the keywords in the text feature vectors.

The present invention also provides a relation extraction method adapted to financial entities and fused with prior knowledge, performed by a relation extraction system adapted to financial entities and fused with prior knowledge, wherein the method at least comprises: training a deep neural network based on finance-related corpora and generating a deep pretrained model capable of recognizing attributes of the financial entities; extracting with respect to Chinese finance-related prior knowledge and outputting positional information and importance vectors of keywords in a Chinese finance-related text; encoding the positional information of the keywords in the Chinese finance-related text so as to obtain attention masks, and inputting the attention masks and entity information of the Chinese finance-related text to the deep pretrained model so as to acquire text feature vectors; and predicting financial-entity relations based on the text feature vectors and the importance vectors received as inputs.

DETAILED DESCRIPTION OF THE INVENTION

Figure 1:
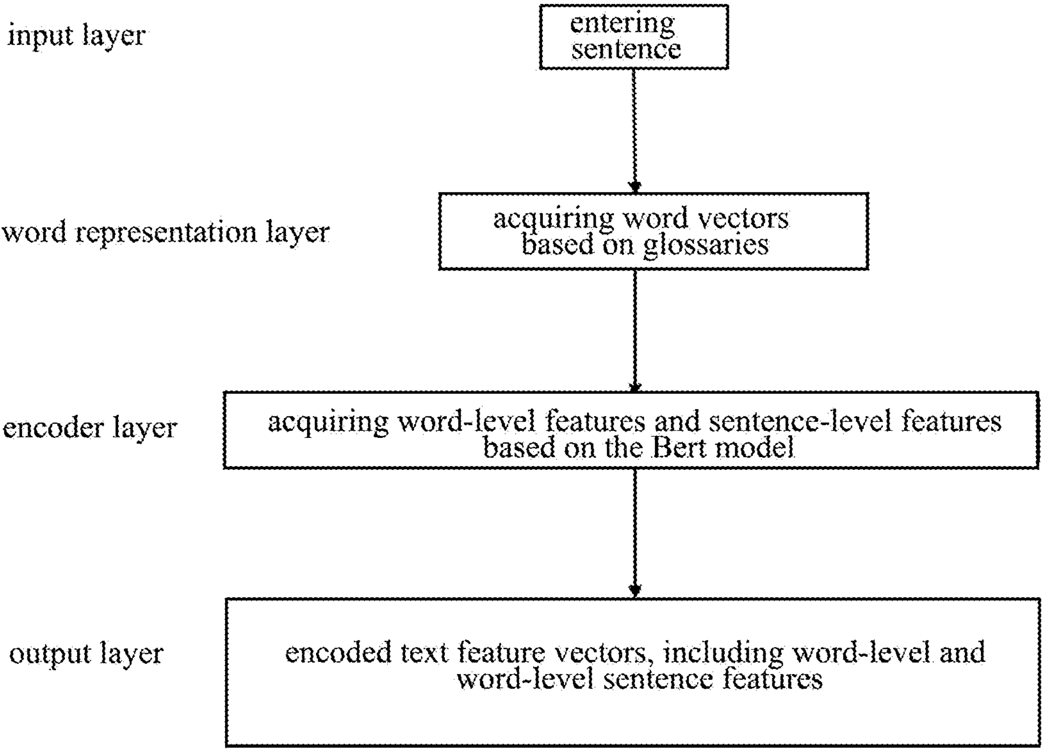
FIG. 1 is a structural diagram illustrating text processing performed by a financial-entity-relation extracting system of the present invention.

The present invention will be detailed with reference to the accompanying drawings.

Aiming at the shortcomings of the prior art, the present invention provides a relation extraction system adapted to financial entities and fused with prior knowledge and its method, having improved capability of extracting text features according to Chinese finance-related prior knowledge and therefore improved semantic expressing ability. By training text feature vectors with a multi-class optimal margin distribution model, the present invention performs better than existing relation extracting models in Chinese finance-related relation extracting tasks.

A BERT model is a large pretrained deep learning model. In the present invention, its pretraining is performed using massive Chinese finance-related corpora, so that the BERT model is suitable for mining texts related to the financial sector. Meanwhile, fine tuning is conducted to enable the BERT model to provide better expression of word vectors in relation extracting tasks.

A BERT-LSTM+CRF model is an open-source model for recognizing entities. The BERT model may be used for word embedding to obtain sentence vectors. The LSTM model learns contextual contents of sentences and provides annotation information of every word. The CRF layer is for limiting syntactical requirements so as to improve annotation. The present invention uses such a model to pre-process corpora so as to obtain entity information in sentences. The disclosed relation extraction system adapted to financial entities and fused with prior knowledge comprises at least a processor. The processor at least comprises a deep pretraining module, a keyword analyzing module, an attention mechanism module, and an optimal margin distribution model module. The deep pretraining module and the keyword analyzing module are in connection with the attention mechanism module, respectively, in a wired or wireless manner. The optimal margin distribution model module and the attention mechanism module are connected in a wired or wireless manner. The wired manner may be realized by a data bus.

The deep pretraining module, the keyword analyzing module, the attention mechanism module, and the optimal margin distribution model module may each be an application-specific integrated chip, a processor, a server, or the like capable of executing corresponding tasks. For example, the deep pretraining module is configured to run a deep neural network model that is trained with input Chinese finance-related corpora into a deep pretrained model.

The keyword analyzing module is configured to execute an encoding process corresponding to the step of extracting positional information and importance vectors of keywords in Chinese finance-related texts according to Chinese finance-related prior knowledge and outputting the positional information and importance vectors of keywords.

The attention mechanism module is configured to execute an encoding process corresponding to the step of encoding the positional information of the keywords in the Chinese finance-related text so as to obtain the attention mask.

The optimal margin distribution model module is configured to execute an encoding process corresponding to the step of predicting financial-entity relations based on the text feature vectors and the importance vectors received as inputs.

As shown in FIG. 1, in the present invention, the text processing framework of the first BERT model comprises an input layer, a word representation layer, an encoder layer and an output layer. In the input layer, an input component or an input port is for entering sentence information. In the word representation layer, "word vectors are acquired based on glossaries." In the encoder layer, "word-level features and sentence-level features are acquired based on the BERT model." In the output layer, an output component or an output port is for outputting the encoded text feature vectors, including word-level and phrase-level sentence features.

Figure 2:
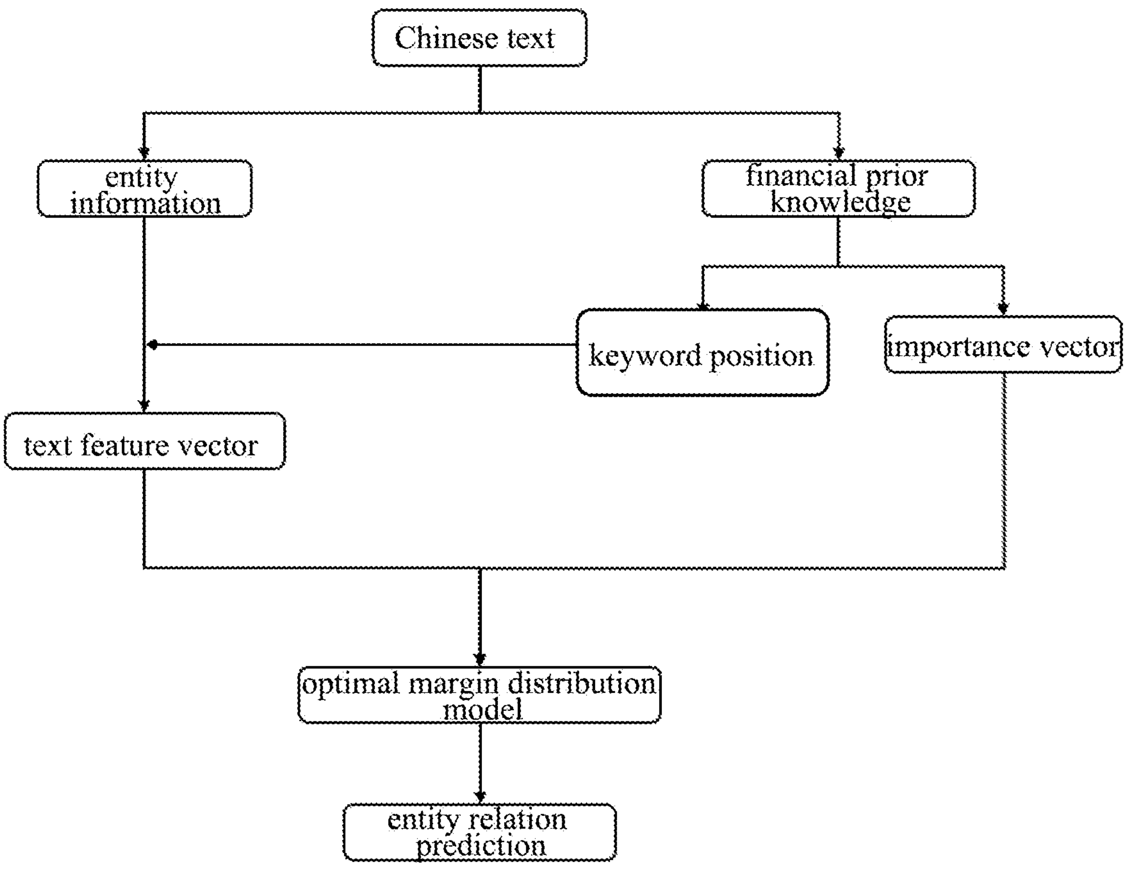
FIG. 2 is a logical diagram of a relation extracting model of the financial-entity-relation extracting system of the present invention.

As shown in FIG. 2, the disclosed relation extraction system adapted to financial entities and fused with prior knowledge basically operates in the following process.

The deep pretraining module for training a deep neural network based on finance-related corpora and generating a deep pretrained model capable of recognizing attributes of the financial entities. As compared to extensive introduction of contextual information in the sentences as conducted by general pretrained models, targeted training with Chinese finance-related corpora as performed by the present invention is more accurate, leading to a deep pretrained model that is more expressive and word embedding vectors that are more relevant to application-specific scenarios.

The keyword analyzing module is for extracting with respect to Chinese finance-related prior knowledge and outputting positional information and importance vectors of keywords in Chinese finance-related texts. The prior knowledge in the financial sector provides very important information and it is possible that merely a few keywords can give the gist of the whole sentence. By enriching text features with keyword positions and importance vectors, relation extracting tasks can be accomplished more efficiently and accurately.

The attention mechanism module is for encoding the positional information of the keywords in the Chinese finance-related texts so as to obtain attention masks. The attention mask together with entity information of a Chinese finance-related text is then input to the deep pretrained model so as to acquire text feature vectors. The attention mask helps the deep pretrained model to know which are the positions in the text it has to pay special attention, so as to eliminate interference with sentence contextual information inference caused by other irrelevant texts.

The optimal margin distribution model module is for predicting financial-entity relations based on the input text feature vector and the importance vector. The optimal margin distribution model is based on the latest research on the theory of statistical learning, and optimizes the mean and the variance of margin between sample and interface, so as to obtain improved classification results and enhanced generalization ability.

The keyword analyzing module operates as detailed below.

At S11, the deep pretraining module runs a deep neural network model. The deep pretrained model is preferably a BERT deep neural network. The deep pretraining module uses the related corpora extracted from Chinese finance-related entity relation as input of the deep neural network model so as to realize model fine tuning and obtain a deep pretrained model.

Therein, model fine tuning is a process where the deep pretrained model performs pre-operation before executing a real work to adapt itself to the current task. It is about adding a Softmax layer on the last output of the BERT deep neural network model for classifying tasks, and using the aforementioned finance-related corpora in pretraining for relation extracting tasks.

At S12 the deep pretrained model receives entity annotation and entity attributes and uses them as pretrained model features for training so as to output a text feature vector, denoted as $v_1$.

The text feature vector is a sentence vector obtained by inputting a training sample to a BERT deep neural network model. For example, by inputting a sentence read as "The Shanghai headquarters of CC invests one billion in the B technology, with A appointed as the technical director" into a BERT deep neural network model, the BERT deep neural network model encodes the sentence vector and outputs a text feature vector [0.75, 0.23, 0.87, . . . , 0.88]. This vector is useful in various tasks.

The deep pretraining module uses the BERT deep neural network model to execute entity annotation. Similarly, the deep pretraining module uses the collected Chinese finance-related corpora as training data with entities therein annotated by BIO. Then the existing BERT-LSTM+CRF model is used to conduct training and prediction, so the resulting model can do entity annotating tasks, namely annotating entities in the input sentence.

The deep pretrained model in the deep pretraining module processes the collected financial corpora and extracts entity attribute information. The entity attribute information may be for example company names, people names, place names or so. For example, from the sentence read as "The Shanghai headquarters of CC invests one billion in the B technology, with A appointed as the technical director", the followings can be extracted: CC, as a company whose attribute is a company; A whose attribute is a people name; and Shanghai whose attribute is a place name. The deep pretraining module also runs another BERT deep neural network model, which adds a Softmax layer at the last layer of the text for multi-class predicting tasks. With the annotated entities, the deep pretrained model sends the entity information to the second BERT deep neural network model to identify the attributes of the entities as company names, people names, or the like.

The keyword analyzing module is for extracting according to Chinese finance-related prior knowledge and outputting positional information and importance vectors of keywords in Chinese finance-related texts.

In the present invention, the prior knowledge refers to Chinese sentences conveying information about the financial sector. For example, with a sentence read as "Company A invests in Company B", the word "invest" is a term particularly relevant to finance, and the word is likely to imply the relation of partnership. As another example, with a sentence read as "A is responsible for granting funds in the financial department in B Company", the word "financial department" is finance-related, and the relation between A and B Company is likely to be employment. This relation information obtained from human experience is the so-called prior knowledge.

Specifically, the keyword analyzing module operates as below.

At S21, it analyzes the Chinese finance-related texts and collect the related corpora, and partitions corpus sets based on a collected Chinese finance-related glossary and/or the financial-entity relation.

Therein, the keyword analyzing module extracts common words from the Chinese finance-related texts as supplements to a general word-segmentation dictionary, so as to form the finance-related glossary.

The keyword analyzing module partitions corpus sets by financial-entity relation. The corpora are texts used in training. In the present invention, the corpora include texts related to the field of fintech, such as a text read as "Company A and Company B enter partnership in the internet-based financial business". Taking the sentence "Company A and Company B enter partnership in internet-based financial business" for example, Company A and Company B are entities, and their relation is "partnership".

Common Chinese finance-related words are, for example, investment, joint venture, buy shares, acquire, hold a post, general manager. On the other hand, "monitoring", "capture" and "education" are word not often seen in finance-related texts. The criterion to determine commonness is set directly based on the collected financial corpora. Particularly, words are extracted from the collected corpora information and the counts of their respective occurrence directly provide the criterion of their commonness.

At S22, word segmentation is performed on the corpus sets corresponding to Chinese finance-related text, and words are sorted by word frequency.

The keyword analyzing module runs a Chinese word-segmenting model. The Chinese word-segmenting model may be a python-based Chinese text processing package jieba, or may alternatively be another application having the same function.

The Chinese word-segmenting model processes the directly input and collected finance-entity relations based on a specific dictionary and runs automatic segmentation of Chinese words.

S23 is about normalizing word frequencies of the keywords whose sorted places are higher than a predetermined place and word frequencies of synonyms of these keywords into the importance vectors.

The keyword analyzing module, based on the word frequency a of each word as statistically determined by the Chinese word-segmenting model, selects the top n most frequently occurring words as keywords. Thus, for the entity relation r, its keyword dictionary is $d_1=[d_1,d_2, \ldots, d_n]$.

The keyword analyzing module extracts common words from the Chinese finance-related texts as supplements to a general word-segmentation dictionary, so as to form the dictionary specific to the financial sector.

At S24, the keyword set of the financial-entity relations and the corresponding importance vectors are output.

The keyword analyzing module normalizes the word frequencies of the keywords whose sorted places are higher than a predetermined place and word frequencies of synonyms of these keywords into the importance vectors by:

$$p_i = a_i / \sum_{i=1}^{n} a_i$$

Therein, $p_i$ denotes the importance vector, $a_i$ denotes the word frequency, n denotes a preset number, and i denotes the index of the statistically top n words. The importance vector refers to a vector composed of the importance values of multiple keywords.

For example, for the relation "cooperation", five most frequently occurring words are collected based on Chinese finance-related corpora, including ["strategic partner", "investment", "buying shares", "joint venture" and "joint development"] with word frequencies of 90, 80, 70, 60, and 50, respectively.

The word "strategic partner" has a word frequency $a_1=90$, and an importance value $p_1=90/(90+80+ \ldots +50)$.

The word "investment" has a word frequency $a_2=80$, and an importance value $p_2=80/(90+80+ \ldots +50)$.

The word "buying shares" has a word frequency $a_3$=70, and an importance value $p_3$=70/(90+80+ . . . +50).

The word "joint venture" has a word frequency $a_4$=60, and an importance value $p_4$=60/(90+80+ . . . +50).

The word "joint development" has a word frequency $a_5$=50, and an importance value $p_5$=50/(90+80+ . . . +50).

In the present invention, the attention mechanism module operates as below.

At S31, it extracts structure representation vectors of the financial entities.

At S32, it performs vector optimization on the financial entity that has a specified name based on self-attention features in sentences so that certain discrimination exists between/among the structure representation vectors of the same entity in the different sentences.

The self-attention feature means to that different words or words shall be represented by different vectors in different sentences.

At S33, the positional information of the keywords is encoded so as to obtain the attention mask.

Specifically, the attention mechanism module encodes keywords in the text according to an attention mechanism. According to the positional information of the keywords, an attention mask m is set in the Chinese finance-related text. Therein, when the Chinese finance-related text contains any keyword, m=1; otherwise, m=0. For a part of the Chinese finance-related text where the attention mask m=1, a larger weight is assigned so as to reflect information of the keywords in the text feature vectors.

The attention mechanism is a way to obtain the key information in an input sample. For example, in a sentence read as "for expanding the Chinese market, a part of products of M Company has been marketed through online self-run businesses or offline cooperative operations like A, B, and C, and launched at some supermarkets in Shanghai, Beijing, and Guangzhou, increasing awareness of M products in China", entities "M Company", "A, B, and C", "online self-run business or offline cooperative operations" and the keyword "the Chinese market" are to be focused on. Thus, in the attention mechanism module, when the text is input to the deep pretrained model, an attention mask related to these keywords in this sentence is also input. To be specific, the positions corresponding to these words are annotated with 1, and the other positions are annotated with 0, so that the deep pretrained model can pay special attention to these words during training.

In the present invention, the optimal margin distribution model module operates as below.

At S41, the optimal margin distribution model stitches the received text feature vectors and the importance vectors together to form sentence representation vectors and input them into an optimal margin distribution model.

Specifically, the k entity relations and the corresponding importance vectors of the top n keywords can form an importance matrix P sized k×n. For each row in P, if the text contains some keyword, the corresponding importance value in P remains unchanged. If there is not any keyword in the text, the value in P is set as 0, and the updated importance matrix P' is expanded into an importance vector $v_2$ having a length of k×n. The importance vector $v_2$ is stitched with the text feature vector $v_1$ to form a sentence representation vector $x=[v_1,v_2]$.

In an example where the deep pretraining module analyzes the collected Chinese finance-related corpora only for two entity relations, namely "partnership" and "hold a post" during word segmentation, words occurring in the corpora about the relation of "partnership" are extracted and sorted by word frequency as "strategic partner", "investment", "buying shares", "joint venture", "joint development", "operate" and "offline". Then the keyword analyzing module only takes the four words occurring most frequently to form a keyword dictionary ["strategic partner", "investment", "buying shares", "joint venture"]. The entities having the relation of "partnership" are those most likely to be relevant to the keyword dictionary. For the corpora about the relation of "hold a post", the keyword analyzing module also takes the statistically top 4 words to form a keyword dictionary of ["guide", "lead", "sector", "management"], and computes the importance value $p_i$ according to the word frequencies of the keywords. So, for the relation "partnership", the optimal margin distribution model generates an importance vector $[p_{11},p_{12},p_{13},p_{14}]$. Similarly, for "hold a post", the optimal margin distribution model also generates a four-dimension importance vectors written as $[p_{21},p_{22},p_{23},p_{24}]$. If there are k different relations, then there may be k×4 different importance vectors, which means a k×4-sized importance matrix can be formed.

The optimal margin distribution model then expands it into a 4k×1-sized sentence representation vector. For the foregoing two relation importance vectors, an importance vector as $[p_{11},p_{12},p_{13},p_{14},p_{21},p_{22},p_{23},p_{24}]$ is obtained. When an input text has any feature vector showing "investment" and "management", the importance vector $v_2$ corresponding to the text feature vector $v_1$ is $[0,p_{12},0,0,0,0,0,p_{24}]$. The importance vector $v_2$ is stitched with the text feature vector $v_1$ to form a sentence representation vector, which is to be used subsequently by the multi-class optimal margin distribution model.

At S42, the optimal margin distribution model outputs prediction information of the financial-entity relation.

The optimal margin distribution model is trained according to the input sentence representation vector. The expression of the optimal margin distribution model is as below, thereby eventually accomplishing the financial relation extracting task.

$$\min_{w_l,\xi_i,\epsilon_i} \frac{1}{2}\sum_{l=1}^{k}\|w_l\|^2 + \frac{\lambda}{m}\sum_{i=1}^{m}\frac{\xi_i^2+\mu\epsilon_i^2}{(1-\theta)^2}$$

$$\text{s.t. } w_{y_i}^\top x_i - \max_{l\neq y_i} w_l^\top x_i \geq 1-\theta-\xi_i$$

$$w_{y_i}^\top x_i - \max_{l\neq y_i} w_l^\top x_i \leq 1+\theta+\xi_i,\ \forall\, i$$

Therein, i denotes the sample index; μ denotes the weight of the interval variance; m denotes the total number of samples; θ denotes the parameter controlling the number of support vectors; $\omega_l$ denotes the parameter of the classifier of the $l^{th}$ class; k denotes the total number of classes; λ denotes the balancing parameter; y denotes the real class corresponding to the sample; and Φ(·) denotes feature mapping based on some certain positive definite kernel.

Therein, $$w_{y_i}^T\phi(x_i)$$

denotes the prediction of the $i^{th}$ sample on the corresponding real class; and $$w_l^T\phi(x_i)$$

denotes the prediction of the $i^{th}$ sample on the $l^{th}$ class.

The disclosed financial-entity relation extracting method fused with prior knowledge will be further detailed with the following use case.

Steps of the disclosed financial-entity relation extracting method fused with prior knowledge are at least as below.

At S51, for every module, corresponding models are pre-constructed.

In the deep pretraining module, BERT deep neural network models and a BERT-LSTM+CRF model are constructed. The first BERT deep neural network model is for entity attribute predicting tasks, and the second BERT deep neural network model is for entity relation extracting tasks, while the BERT-LSTM+CRF model is for entity annotating tasks.

An entity attribute predicting model is now constructed. Entities in the financial corpora and entity attributes are sent into the first BERT deep neural network model as samples and annotators, respectively. The first BERT deep neural network model adds a Softmax layer on the last layer for multiple classification, so as to obtain a model for prediction of entity attributes.

An entity relation extracting model is then constructed. A second BERT deep neural network model with the additional Softmax layer is used in training for a relation extracting task. Therein, the Softmax layer enables fine tuning of the second BERT deep neural network model, so as to better adapt the second BERT deep neural network model to the relation extracting task, and thereby more relevant sentence vectors can be obtained for the multi-class optimal margin distribution model to use subsequently.

A multi-class optimal margin distribution model is constructed. After fine tuning of the second BERT deep neural network model, the Softmax layer at the last layer of the second BERT deep neural network model is removed to form a multi-class optimal margin distribution model. The multi-class optimal margin distribution model according to the input text and the attention masks of the positions of the keywords outputs corresponding sentence feature vectors. After the sentence representation vector x is eventually obtained, the multi-class optimal margin distribution model makes relation prediction based on x.

An entity annotating model is constructed. The collected corpora are subject to BIO annotation, and then sent to the BERT-LSTM+CRF model for training, thereby obtaining the entity annotating model.

The entities in collected Chinese finance-related corpora, entity relations, and entity attributes are annotated and used as samples for pretraining.

At S52, the deep neural network is trained based on the finance-related corpora and a deep pretrained model capable of recognizing attributes of the financial entities is obtained.

When all the models have been constructed, model training is performed with existing training sets. After a text is input, the entity annotating model performs entity annotation on the input text so as to obtain entities. The entity annotating model sends each of the entities to the entity attribute predicting model. The entity attribute predicting model then outputs attributes of the entities, wherein the attributes of entities may be company names, people names or others.

The entity relation extracting module selects entity pairs for training of the entity relation extracting model. For example, the input text read as "for expanding the Chinese market, a part of products of ALBO Company has been marketed through online self-run businesses or offline cooperative operations like tmall.com, JD.com, and Pinduoduo, and launched at some supermarkets in Shanghai, Beijing, and Guangzhou, increasing awareness of ALBO products in China" contains many entities, so the training for relation extracting tasks may be conducted using the "ALBO-tmall.com" entity pair and the "ALBO-JD.com" entity pair.

Before inputting the sentence to the entity relation extracting model, the entity relation extracting module stitches attributes of the entities at the tail of the sentence. Taking the foregoing case for example, the "ALBO-tmall.com" entity pair is tailed by the attribute pair "company-company".

At S53, based on the Chinese finance-related prior knowledge, positional information and importance vectors of keywords in the Chinese finance-related text are extracted and output.

The keyword analyzing module constructs an importance vector according to keywords existing in the sentence. The keyword analyzing module, according to k known entity relations, performs word segmentation analysis on corresponding corpora, so as to obtain a dictionary of n different frequently occurring words. After importance computing, a k×n-sized matrix is generated, such as the 2×4 importance matrix constructed for two relations. The importance matrix is the prior knowledge as a result of analysis of the financial corpora.

For example, the k×n matrix is expanded. If the sentence contains a keyword, the importance value of this word is retained; otherwise, a 0 is set. Thereby, an importance vector [0,0,0,0.29,0,0.14,0, . . . , 0.33] is obtained. At S54, encoding is performed according to the positional information of the keywords in the Chinese finance-related text so as to obtain attention masks. Then the attention mask and the entity information of the Chinese finance-related text are input to the deep pretrained model so as to acquire a text feature vector.

The attention mechanism module performs computing according to the obtained dictionary so as to get an attention mask. For example, in a sentence there are words like "expanding the Chinese market", "product" and "online self-run", the values at the corresponding positions are 1, thereby getting an attention mask looking like [0,1,1,1,1, 1,1, . . . , 0,0]. The attention mask is used to, during training, tell the keyword analyzing model that words at these positions may contain important information.

The attention mechanism module inputs the attention mask and the entity information of the Chinese finance-related text to the deep pretrained model. The deep pretrained model outputs a text feature vector. For example, the text feature vector may be [0.021,0.24,0.33, . . . , 0.01].

At S55, based on the input text feature vector and importance vector, prediction of financial-entity relations is made. The optimal margin distribution model module stitches the text feature vector and the importance vector into a sentence representation vector of the input text and sends it to a multi-class optimal margin distribution learning machine for training.

It is to be noted that the embodiments described above are exemplificative. Various modifications thereof are apparent to people skilled in the art with the enlightenment of the present disclosure, and all of these modifications form a part of the disclosure of the present invention as they all fall within the scope of the present invention. It is thus to be understood by people skilled in the art that the description and accompanying drawings provided by the present invention are only illustrative but not limiting to claims of the present application. The scope of the present invention shall be defined by the claims and their equivalents. The description of the present invention contains a number of inventive concepts, such as "preferably", "according to a preferred embodiment" or "optionally" all indicate that the corresponding paragraph discloses an independent idea, and the applicant reserves the right to file a divisional application based on each of the inventive concepts.

What is claimed is:

1. A relation extraction system adapted to financial entities and fused with prior knowledge, the system at least comprising:

a deep pretraining module, for training a deep neural network based on finance-related corpora and generating a deep pretrained model capable of recognizing attributes of the financial entities, a keyword analyzing module, for extracting with respect to Chinese finance-related prior knowledge and outputting positional information and importance vectors of keywords in a Chinese finance-related text;

an attention mechanism module, for encoding the positional information of the keywords in the Chinese finance-related text so as to obtain attention masks, and inputting the attention masks and entity information of the Chinese finance-related text to the deep pretrained model so as to acquire text feature vectors, wherein the attention mechanism module is configured to:

extract structure representation vectors of the financial entities;

perform vector optimization on the financial entity that has a specified name based on self-attention features in sentences so that certain discrimination exists between/among the structure representation vectors of the same entity in the different sentences; and encode the positional information of the keywords so as to obtain the attention masks; and an optimal margin distribution model module, for predicting financial-entity relations based on the text feature vectors and the importance vectors received as inputs, wherein the attention mechanism module is in connection with the deep pretraining module, the keyword analyzing module, and the optimal margin distribution model module, respectively.

2. The relation extraction system of claim 1, wherein the keyword analyzing module is configured to:

analyze the Chinese finance-related text and collect the related corpora, and partition the corpora into corpus sets based on a collected Chinese finance-related glossary and/or the financial-entity relations;

perform word segmentation on the corpus sets corresponding to the Chinese finance-entity relations, and sort the keyword in a descending order by word frequency;

normalize word frequencies of the keywords whose sorted places are higher than a predetermined place and word frequencies of synonyms of these keywords into the importance vectors, and output a keyword set of the financial-entity relations and the corresponding importance vectors.

3. The relation extraction system of claim 1, wherein the optimal margin distribution model module is configured to:

stitch the received text feature vectors and the importance vectors together to form sentence representation vectors and input them into an optimal margin distribution model, and use the optimal margin distribution model to output prediction information about the financial-entity relations.

4. The relation extraction system of claim 1, wherein the deep pretraining module is further configured to:

construct an entity-attribute predicting model based on a first BERT deep neural network model so as to execute entity-attribute prediction, construct an entity-relation extracting model based on a second BERT deep neural network model so as to execute entity-relation extraction, and execute entity annotation based on a BERT-LSTM+CRF model.

5. The relation extraction system of claim 1, wherein the keyword analyzing module is further configured to:

collect the Chinese finance-related glossary by:

extract common words from the Chinese finance-related text as supplements to a general word-segmentation dictionary, so as to form the finance-related glossary.

6. The relation extraction system of claim 5, wherein the keyword analyzing module normalizes the word frequencies of the keywords whose sorted places are superior to the predetermined place and the word frequencies of the synonyms of these keywords into the importance vectors using:

$$p_i = a_i / \sum_{i=1}^{n} a_i$$

where $p_i$ denotes an importance value, $a_i$ denotes the word frequency, n denotes a preset number, and i denotes an index of the statistically top n keywords.

7. The relation extraction system of claim 5, wherein the attention mechanism module obtains the attention masks by:

setting the attention masks m according to the positional information of the keywords in the Chinese finance-related text, wherein when the keywords exist in the Chinese finance-related text, m=1; otherwise m=0.

8. The relation extraction system of claim 1, wherein the deep pretraining module acquires the text feature vectors by:

assigning a high weight to a part of the Chinese finance-related text where the attention mask m=1 so as to reflect information of the keywords in the text feature vectors.

9. The relation extraction system of claim 8, wherein the positional information of the keywords is encoded so as to obtain the attention mask.

10. A relation extraction method adapted to financial entities and fused with prior knowledge, performed by a relation extraction system adapted to financial entities and fused with prior knowledge, wherein the method at least comprises:

training a deep neural network based on finance-related corpora and generating a deep pretrained model capable of recognizing attributes of the financial entities;

extracting with respect to Chinese finance-related prior knowledge and outputting positional information and importance vectors of keywords in a Chinese finance-related text;

encoding the positional information of the keywords in the Chinese finance-related text so as to obtain attention masks, and inputting the attention masks and entity information of the Chinese finance-related text to the deep pretrained model so as to acquire text feature vectors;

extracting structure representation vectors of the financial entities;

performing vector optimization on the financial entity that has a specified name based on self-attention features in sentences so that certain discrimination exists between/among the structure representation vectors of the same entity in the different sentences;

encoding the positional information of the keywords so as to obtain the attention masks; and predicting financial-entity relations based on the text feature vectors and the importance vectors received as inputs.

11. The relation extraction method of claim 10, wherein the method further comprises:

analyzing the Chinese finance-related text and collect the related corpora, and partitioning the corpora into corpus sets based on a collected Chinese finance-related glossary and/or the financial-entity relations;

performing word segmentation on the corpus sets corresponding to the Chinese finance-entity relations, and sorting the keyword in a descending order by word frequency;

normalizing word frequencies of the keywords whose sorted places are higher than a predetermined place and word frequencies of synonyms of these keywords into the importance vectors, and outputting a keyword set of the financial-entity relations and the corresponding importance vectors.

12. The relation extraction method of claim 10, wherein the method further comprises:

stitching the received text feature vectors and the importance vectors together to form sentence representation vectors and inputting them into an optimal margin distribution model, and using the optimal margin distribution model to output prediction information about the financial-entity relations.

13. The relation extraction method of claim 12, wherein the method further comprises:

constructing an entity-attribute predicting model based on a first BERT deep neural network model so as to execute entity-attribute prediction, constructing an entity-relation extracting model based on a second BERT deep neural network model so as to execute entity-relation extraction, and executing entity annotation based on a BERT-LSTM+CRF model.

14. The relation extraction method of claim 13, wherein the method further comprises:

collecting the Chinese finance-related glossary by:

extracting common words from the Chinese finance-related text as supplements to a general word-segmentation dictionary, so as to form the finance-related glossary.

15. The relation extraction method of claim 14, wherein the method further comprises:

normalizing the word frequencies of the keywords whose sorted places are superior to the predetermined place and the word frequencies of the synonyms of these keywords into the importance vectors using:

$$p_i = a_i / \sum_{i=1}^{n} a_i$$

where $p_i$ denotes an importance value, $a_i$ denotes the word frequency, n denotes a preset number, and i denotes an index of the statistically top n keywords.

16. The relation extraction method of claim 15, wherein the method further comprises:

obtaining the attention masks by:

setting the attention masks m according to the positional information of the keywords in the Chinese finance-related text, wherein when the keywords exist in the Chinese finance-related text, m=1; otherwise m=0.

17. The relation extraction method of claim 16, wherein the method further comprises:

acquiring the text feature vectors by:

assigning a high weight to a part of the Chinese finance-related text where the attention mask m=1 so as to reflect information of the keywords in the text feature vectors.

18. The relation extraction method of claim 17, wherein the positional information of the keywords is encoded so as to obtain the attention mask.

* * * * *